Aug. 25, 1964    K. L. ALDERSHOF    3,145,481
PROGRAMMED INSTRUCTION FORMAT AND BOOK
Filed Nov. 3, 1961    2 Sheets-Sheet 2

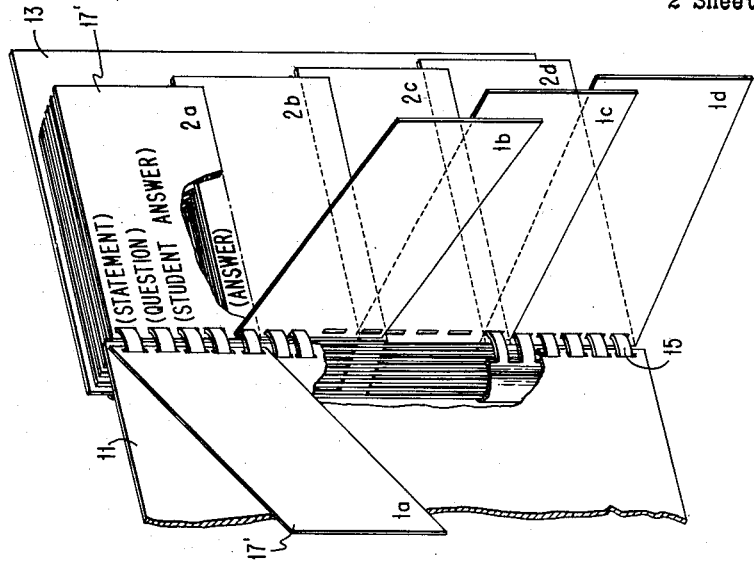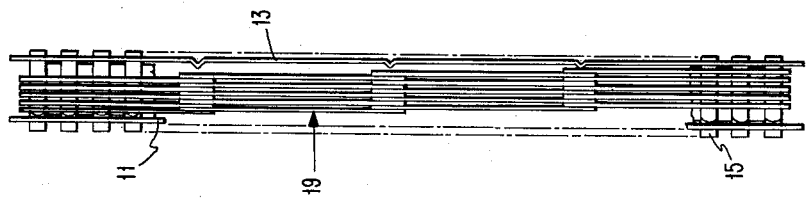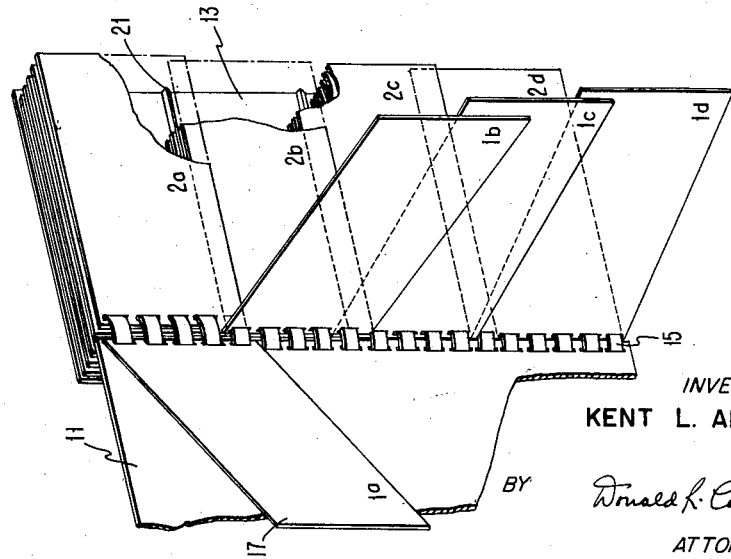

PRIMARY CARD

United States Patent Office 3,145,481
Patented Aug. 25, 1964

3,145,481
PROGRAMMED INSTRUCTION FORMAT
AND BOOK
Kent L. Aldershof, Haddonfield, N.J., assignor to International Business Machines Corporation, New York, N.Y., a corporation of New York
Filed Nov. 3, 1961, Ser. No. 149,972
2 Claims. (Cl. 35—8)

This invention relates to a format for teaching by programmed instruction, and more particularly to an arrangement of record cards or forms which are assembled in a binder to facilitate teaching by a programmed instruction method.

Programmed instruction in the field of education refers broadly to arrangements of text material in small segments wherein a student is questioned about a given segment immediately after having read it. The answer given is checked for correctness by the student. If the answer is correct, the student may go on to the next segment; but in the case of an incorrect answer, procedures are taken for additional teaching either by rereading or by answering supplementary questions to clarify the concept.

Although there are several variations in programmed instruction formats, the principal formats in use are known as the linear sequence type and the branching sequence type. The linear sequence arrangement, of which Skinner is a leading exponent, basically requires answering every question in a sequence. The student reads a portion of text, gives an answer, reconsiders when wrong or proceeds to the next item when right. Some acceleration is possible, as for example if the last ten answers are correct, skip the next five items. Occasionally a student may be referred back if a certain question cannot be answered on the theory that the answer should have been given correctly if the material is being absorbed; however, generally speaking, the material is arranged to have a low error rate in the student responses.

The branching sequence format consists of giving a student a segment of material (frequently a larger segment layer than in the linear sequence) and, on the same page, a multiple choice answer. If the student chooses the correct answer he moves through the material very rapidly. The choice of an incorrect answer leads him to a segment or segments of remedial material and ultimately to the same page that would have been reached by the correct answer. A use of the branching sequence is illustrated by Crowder in his "scrambled" textbooks, so called because the student is directed either forward or backward in the book according to his answer selection, never using the pages in direct sequence. The Crowder books use a full page for each learning segment followed by a multiple choice question. Questions are designed for a higher error rate than linear sequence types. Incomplete concepts or incorrect concepts are determined by choosing an incorrect answer and being directed to a remedial page. This format has the disadvantage of being cumbersome in that it requires excessive flipping of pages back and forth. The same may be true of the linear sequence type of format previously discussed. The linear sequence format has the particular disadvantage of requiring all students to usually cover all the material.

Accordingly, an object of the present invention is to provide a generally improved and more satisfactory format for programmed instruction.

Another object is the provision of a new and improved format for programmed instruction combining desirable qualities of the linear sequence format and the branching sequence format.

Yet another object is to provide a new and improved format for programmed instruction permitting a degree of branching possibilities while preserving an orderly linear sequence for students who have absorbed the material sufficiently so as not to require the branching instruction.

A further object of the invention is to embody the new and improved format in a convenient book form easily understood by a student unfamiliar with this or possibly other kinds of programmed instruction.

The new format for programmed instruction in accordance with the invention is provided in a book comprising sets of cards or forms arranged sequentially one after the other and bound like pages of a book. The familiar record cards suitable for use in business machines and data processing systems may be used conveniently. Each set contains a plurality of cards shingled beneath each other so that the upper edge of each card (except the top one) is covered by the lower edge of the card above. Each card contains a statement and question which the student answers. The correct answer is at the top covered portion of the next card in the set and can be seen by turning over the card on which the answer was made. The various first cards of each of the sets have teaching statements on different topics arranged in a desirable sequence, while succeeding cards in each set have additional statements further explaining the topic introduced by the first card of the set. Thus a student who misses the first question may proceed on to other questions on that topic while a fast student may skip the supplementary questions and work on only the first card in each set unless he feels the need for additional exercise in a particular area. The shingling arrangement of the cards facilitates turning over those cards being omitted.

In a preferred embodiment of the invention, the cards or forms are of the same length, while in a second embodiment the cards in each set have graduated lengths. If desired a box may be included on the card to be filled in by the student, the filled in mark being capable of being automatically sensed to provide a measure of the student's use or non-use of the various cards. Other objects of the invention will now be apparent.

A further object is the provision of a new and improved format for programmed instruction utilizing selectively arranged unit document or record cards.

A still further object is to provide a shingled arrangement of record forms bound together in sets having utility in programmed instruction applications and also in other applications where such an arrangement of forms in shingled sets is advantageous.

Another object is the provision of a plurality of record cards bound together in a book in sets wherein the cards in each set are interleaved with one another to facilitate turning over groups of cards with a single motion.

The foregoing and other objects, features and advantages of the invention will be apparent from the following more particular description of a preferred embodiment of the invention, as illustrated in the accompanying drawings, wherein:

FIG. 1 is a perspective view of a first embodiment of a shingled card arrangement according to the invention illustrating the new programmed instruction format, portions being broken away to disclose underlying cards;

FIG. 2 is a side view of the card arrangement of FIG. 1 with all the cards folded over upon one another in superimposed sets;

FIG. 4 is a view similar to FIG. 1 of a second embodiment of the invention;

FIG. 5 is a plan view of a primary or top card of each set while

Figure 5:
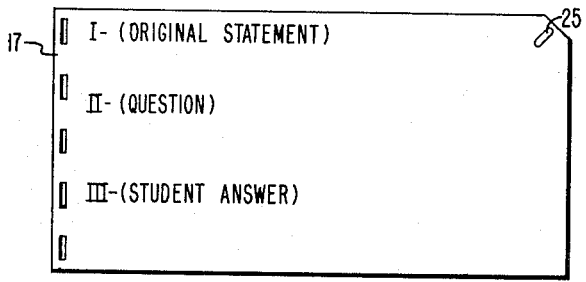

In FIG. 1 is shown a programmed instruction book having a front cover 11 and a back cover 13 joined together at the side by a ringed binding member 15. The inside of the book is made up of a plurality of record cards or forms 17 similar to those suitable for use in business machines and data processing machines. However, it will be understood that the invention is not limited to the use of such record cards and may be practiced using cards or forms of a different character. In the preferred embodiment, the cards 17 are bound together in sets and the cards of each set are in a "shingled" arrangement with the upper edge of one card, except the first, covered over by the bottom edge of the card above. The book is composed of a number of sets of four cards each which overlie one another when the book is closed as shown in FIG. 2. A particular set of cards is not fully exposed until all the four cards of the previous set have been turned over, like the pages of a book.

To describe the book of cards arranged in partially overlapping sets, it is useful to number the sequentially occurring sets 1, 2, 3, 4, 5, etc. Let the first or topmost card of each set be identified by letter a, the next form partially covered over by this one letter b, and c and d for the two lowermost forms. Each card in this manner can be given a unique identification, such that the entire assembly consists of cards 1a, 1b, 1c, 1d, . . . 2a, 2b, 2c, 2d, . . . 3a, 3b, 3c, 3d, . . . etc. As the front cover 11 of the book is opened, only the first card in the first set, card 1a, is fully exposed. Cards 1b, 1c and 1d are partially covered over. The other sets of cards are, of course, substantially superimposed upon one another and, generally speaking, are not visible behind the first set of cards. Before proceeding to an explanation of the application of this arrangement of cards to a format for programmed instruction, it will be advantageous to further explain the physical coupling of the cards by the shingled arrangement. This can be most easily seen by assuming that card 1a is turned over to the left like the page of a book. Upon then turning over card 2a, it is seen that card 1b, by means of its overlapping relation with that card, is also carried along. Upon next turning over card 3a, cards 2b and 1c are also turned over. Turning card 4a carries along cards 3b, 2c and 1d. In general, it can be said that turning over one card entrains an adjacent overlapping card, together with the card or cards which in turn are in overlying relation with this card, etc.

Figure 3:
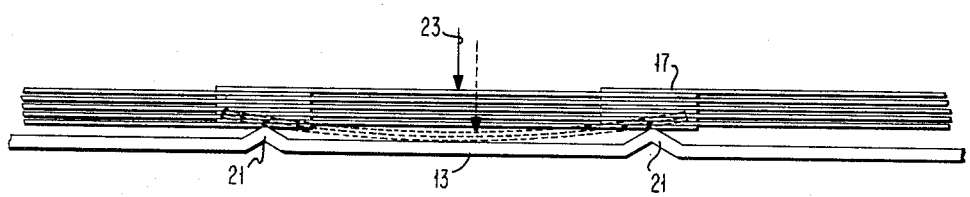
FIG. 3 is a fragmentary side view of an embodiment of FIGS. 1 and 2 illustrating a modified form of back cover.

In a similar manner, turning over one of the other cards in a set (i.e., those not in the a group) entrains and turns over those cards coupled to it by the shingled relation. In the embodiment of FIG. 1, all of the cards 17 making up the book are of the same length and it may be difficult to grasp one of the lower cards to turn it over. In turning over card 1b, for instance, it is convenient to slightly raise a corner of the card so that it can be grasped by the finger. In FIG. 2, it will be noticed that the overlapping areas of the various cards substantially overlie each other to produce a thicker bulk in these areas. Lifting the corner of a selected card slightly may be accomplished by pressing down with the thumb in the area between the overlapping portions of the cards, as indicated by the arrow 19. When this is done, assuming the card 1a is turned over, it is seen that the upper right-hand corner of card 1b is raised slightly from the underlying card 2a so that the finger of the person using the book can easily grasp this raised corner and turn over the card. This procedure becomes difficult toward the end of the book where there is an insufficient bulk of cards. In this case, as shown in FIG. 3, it is desirable to provide the back cover 13 of the book with a series of raised ridges 21 extending across the cover approximately parallel to each other and to the top edge of the cover. The ridges 21, as illustrated, are desirably pressed out of the cover material itself, although the manner in which the ridges are formed is of no particular consequence. Upon depressing the edge of the cards in the area between the ridges 21, it is seen that there is now sufficient room to curve the cards as shown in dotted lines and raise the upper right-hand corner of the uppermost card so that it can be grabbed by the finger.

Another system for making it convenient to turn over cards other than the top one is shown in FIG. 4, which illustrates a second embodiment of the invention wherein the cards 17' are of graduated length. That is, the top group of cards are relatively short, the b cards slightly longer, the c cards even longer, and the d cards are the full length, whereby the upper right hand corners of the cards are exposed. Card 1a having been turned over, it is very easy to grasp the exposed corner of card 1b with the fingers and turn it over. The different lengths of the cards is the only difference between the embodiments of FIG. 1 and FIG. 4, which in other respects are identical.

Figure 6:
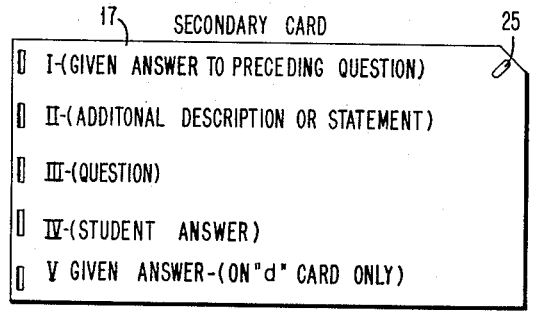
FIG. 6 is a similar view of a secondary or succeeding card in each set; and, FIG. 7 is a schematic diagram of the card arrangement illustrating the branching choices within each set of cards.

In order to understand the application of the arrangement of shingled cards in overlying sets to a new format for programmed instruction, it will be recalled that programmed instruction in the field of education refers to divisions of text material into small segments wherein a student is questioned about a given segment immediately after having read it. The answer given is then checked for correctness, usually by the student himself. Referring to FIG. 5 and FIG. 6, each card according to the invention is provided with a statement of text material, and below the statement appears a question on that material and a place for a student's answer. The question and answer may take various forms, such as a statement with a fill-in answer, a true-false response, or a multiple choice response. The student in general is required to construct an answer in some suitable manner to test his understanding of the segment of text material presented by the statement at the top of the card.

As best shown in FIG. 4, the correct answer to the question on one card is printed at the top of the next card in the set, on that portion of the card which is normally covered up by the card above. Thus the correct answer to the question on card 2a is printed at the top of card 2b. After having written in the response to the question on card 2a, the student may immediately check his answer by turning card 2a to expose the correct answer at the top of card 2b. In a similar manner, the question on card 2b has its correct answer printed at the top of card 2c, and the answer to the question on card 2c is printed at the top of card 2d. In order that the answer to the question on card 2d not be exposed to the student when he reads the statement on card 2d and makes his response to the question thereon, it is convenient that the answer to this question be printed at the bottom of card 3d. Thus the answer to this question may in the same manner be checked by turning over the card. It may be desirable in some instances to place the answer to the question on the final card of the set in some other place, such as on the back of the card.

It has been explained that the top or primary card in each set (as in FIG. 5) has a statement on a segment of text material. In the case that the student gets the question on this card wrong, he may proceed to the other or secondary cards in the set (as in FIG. 6) for additional instruction and explanation. Thus the statement on card 1b is a further explanation or statement on generally the same topic of material as on card 1a. In a similar manner, the statements on cards 1c and 1d are intended for the remedial teaching of a student who misses the questions on cards 1a and 1b and feels a need for further instruction on this particular topic. The normal sequence is to proceed from card 1a to card 1b, then to card 1c and 1d as the statements and instruction given on a lower card are graduated to guide students who miss the questions on the preceding card in the set.

Card 2a has a statement of text material which is on a generally different topic from that of card 1a and the other cards in this set. In a similar manner, cards 2b, 2c and 2d have further explanations and instructions on the topic of card 2a. Card 3a has a statement on the next topic to be presented after the topics of cards 1a and 2a, and the lower or secondary cards in this set have additional explanation of the topic of card 3a. In general, the top or primary cards of each set have instruction on different topics arranged in a good teaching sequence, whereas the lower or secondary cards in each set have additional explanation or instruction on the topic presented by that set if the student feels the need for it.

Figure 7:
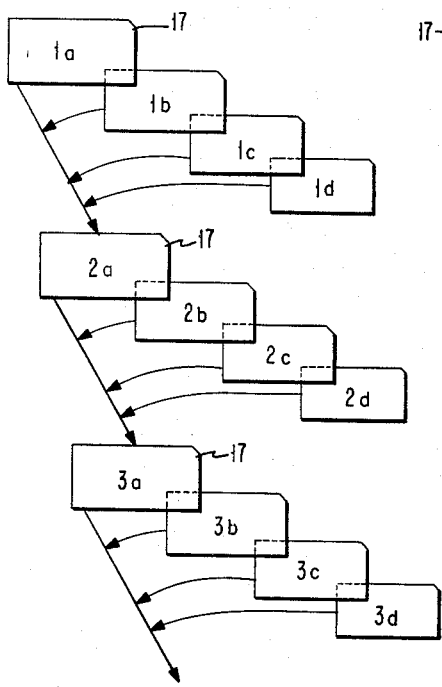

In accordance with the invention, the student may proceed linearly through the primary cards optionally branching into the secondary group of cards in a particular set whenever he feels the need for additional work on that topic. This is shown diagrammatically in FIG. 7. For instance, a student who is a rapid learner and has some background in the field may proceed through the primary cards for the first part of the course of material covered by the book, and then branch down into the secondary cards for additional explanation when he reaches segments of the text which he is less familiar with and feels he should spend some more time on. On the other hand, a person entirely new to the fields covered by the programmed instruction book may feel it desirable to go through any or all of the cards to give him a better background. This format of linear sequence with convenient branching when it is felt necessary is also particularly adaptable to students with differing backgrounds who may find that certain topics on the primary cards are within their field of learning. Taking, for example, a programmed book on the basic fundamentals of data processing systems, it is understandable that a mathematician and an engineer will be more familiar with different parts of the text material, whereas the manager of a business office may have greater familiarity with still other portions of the text. This programmed instruction format accommodates rapid and slow learners and allows the individual to choose his own pace.

The shingled arrangement of cards described in some detail previously facilitates this optional branching in the program and has the particular advantage that unselected cards due to the shingling arrangement are automatically turned out of the way. It is not necessary to turn over each card individually to get it out of the way in order to uncover the next card which is to be used. Although a programmed instruction book made up of sets of four cards each has been described, it will be understood that fewer or greater branching possibilities may be provided by using sets of three or five cards or whatever number is found to be most advantageous. For the particular programmed instruction format discussed, it has been determined by psychologists that four questions on a particular topic have usefulness in instructing the student and that other methods of teaching are more beneficial to the student who still has not grasped the subject matter after four questions.

The arrangement of cards or forms is such that the complete assembly of cards can be worked through in one direction, beginning at one cover and proceeding toward the other cover, and then the entire book or assembly can be turned over and the complete assembly can be worked through in the opposite direction. This permits using both sides of every card. From either direction, the arrangement of cards and the use is exactly the same.

The use of standard record cards or forms gives rise to a number of advantages. The record card is readily adaptable to be punched at the left side with holes for standard binding members such as the ringed member 15 illustrated. The binding element is preferably of the type which can be disengaged easily to remove the cards for manual or machine processing. If it is desired to keep track of the students' activity or non-activity as to various parts of the program or groups of cards, each card 17 may be provided in its upper right-hand corner or other suitable location (see FIGS. 5 and 6) with a box 25 to be filled in by the student upon his completion of the answer on that card. After the book has been disassembled, these marks may be machine sensed to provide a measure of the use or non-use of the various cards. A scoring of this kind may also be of assistance in indicating the need for revisions to the program itself.

The format for programmed instruction according to the invention provides a unique combination of the linear sequence and branching sequence formats as presently known. The linear sequence and optional branching possibilities of the programmed book which has been described is immediately evident to the student, even one who has never had previous experience with programmed instruction formats. The student immediately sees what the branching possibilities are and approximately how long it will take him to cover the material. This is in contrast to some programmed instruction books in which the student is required to flip from page to page, not knowing how long the branching questions will take him.

Although described with regard to a preferred use as a programmed instruction book, it is evident that the shingled arrangement of bound cards in overlying sets may have other applications. For instance, when used as a format for troubleshooting or servicing aid, the user performs a test or some other action as directed by a primary card, then branches to a secondary card or proceeds to the next primary card depending on the result of the test or action. In this regard, it may be desirable that the cards be cut or notched or thumb indexed in various ways to facilitate turning them over, to suit the application. Furthermore, the forms or cards used may be of various sizes, colors, shapes, materials, weights, etc., as is best called for by the particular application.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An arrangement of record forms of substantially uniform width comprising a plurality of sets of forms and a back cover member bound together at one side thereof by removable binding means, said sets of forms being approximately superimposed upon one another, similar to pages of a book, each of said sets comprising a plurality of forms shingled together with an upper portion of each of said forms other than the top form underlying the lower portion of the form immediately above, overlapping areas of corresponding ones of the various sets of forms substantially overlying each other, whereby turning over a particular form entrains and carries along all those forms overlying the particular form in shingled relation, and a plurality of ridges secured to said back cover each underlying an overlapping area of said sets of forms to facilitate grasping of the forms by digital pressure between said overlapping areas to slightly raise a corner of a particular form to be grasped.

2. A programmed instruction book comprising front and back cover members and a plurality of record forms of approximately the same size therebetween all bound together at one side by a binding member, said forms being arranged in sets substantially overlying one another similar to pages of a book, each of said sets comprising a plurality of forms shingled together with an upper portion of each of said forms other than the top form underlying the lower portion of the form immediately above, whereby turning over a particular form about said binding member entrains and carries along all those forms overlying the particular form in shingled relation, a statement and a question on each of said forms and also means for entering a student response, a correct answer for the question on one form in a set on the portion of the next form in the set which underlies said one form, the correct answer for the bottom form of each of said sets being on the corresponding form of the next set, overlapping areas of the shingled forms in each of said sets substantially overlying one another, and a plurality of substantially parallel ridges carried by said back cover member, each of said ridges underlying one of said overlapping areas whereby digital pressure applied to the side of said forms between said overlapping areas raises the corner of a form in position to be grasped and turned over.

References Cited in the file of this patent

UNITED STATES PATENTS

| | | |
|---|---|---|
| 2,169,266 | Matter | Aug. 15, 1939 |
| 2,234,075 | Carolin | Mar. 4, 1941 |
| 2,274,944 | Trussell | Mar. 3, 1942 |

FOREIGN PATENTS

| | | |
|---|---|---|
| 918,410 | France | Feb. 7, 1947 |

OTHER REFERENCES

Gilmore: "Electronic Teaching Machines," p. 60, Popular Electronics, November 1960.